(No Model.)
J. CARTER.
COMBINED FILTER AND COOLER.
No. 308,058. Patented Nov. 18, 1884.
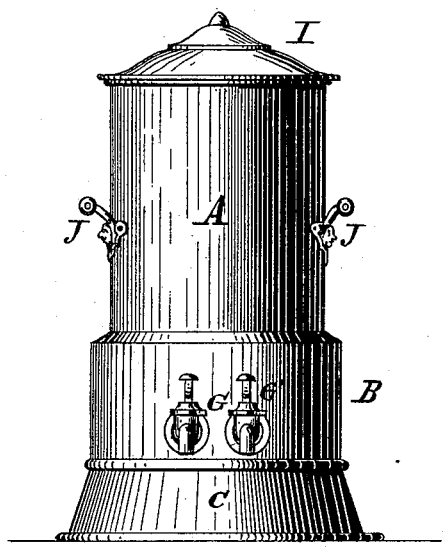
FIG. 1.
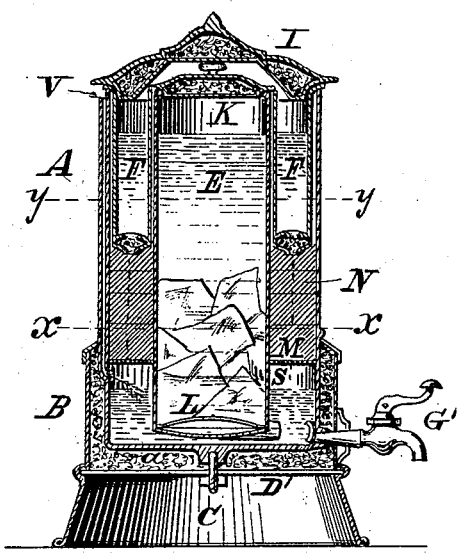
FIG. 2.
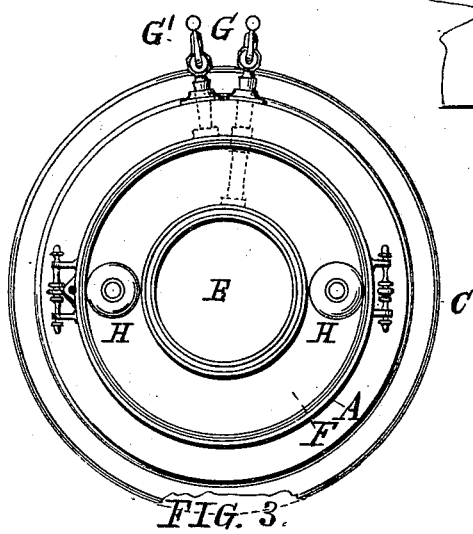
FIG. 3.
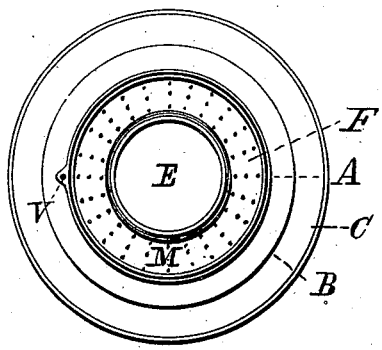
FIG. 5.
FIG. 4.
FIG. 6.
Witnesses:
Al. Stark.
Willie O. Stark
Inventor:
James Carter,
by Michael J. Stark,
Attorney.

United States Patent Office.

JAMES CARTER, OF LOCKPORT, NEW YORK.

COMBINED FILTER AND COOLER.

SPECIFICATION forming part of Letters Patent No. 308,058, dated November 18, 1884.

Application filed July 26, 1884. (No model.)

*To all whom it may concern:*

Be it known that I, JAMES CARTER, of Lockport, in the county of Niagara and State of New York, have invented certain new and useful Improvements in a Combined Filter and Cooler; and I do hereby declare that the following description of my said invention, taken in connection with the accompanying sheet of drawings, forms a full, clear, and exact specification, which will enable others skilled in the art to which it appertains to make and use the same.

My present invention has general reference to a combined water filter and cooler; and it consists, essentially, in the novel and peculiar combination of parts and details of construction, as hereinafter first fully set forth and described, and then pointed out in the claims.

In the drawings, already referred to, which serve to illustrate my said invention more fully, Figure 1 is a side elevation of my improved combined water cooler and filter. Fig. 2 is a longitudinal sectional elevation of the same. Fig. 3 is a plan in line $y\ y$, and Fig. 4 a similar view in line $x\ x$, of Fig. 2. Fig. 5 is a transverse sectional elevation of a portion of the filter-water receptacle, showing the construction of the sponge-cup. Fig. 6 is a similar view of the false bottom for the ice-receptacle.

Like parts are designated by corresponding letters of reference in all the figures.

The object of my present invention is the construction of a simple, convenient, and efficient combined water filter and cooler in which the water resulting from the melting of the ice shall be kept separate from the filtered water, to prevent contamination of the latter in cases where impure ice is being used for cooling the filtered drinking-water. To attain these results I construct my improved combined filter and cooler essentially of a cylindrical receptacle, A, having a bottom, $a$, said cylinder A resting upon an enlarged jacket, B, having a base, C, provided with a diaphragm, D, serving as a bottom for the charcoal filling around the cylinder A, as clearly shown in Fig. 2.

Within the receptacle A, I place an ice-receiver, E, consisting of a cylindrical receptacle having a bottom, E', said receiver E being sufficiently smaller than the outer cylinder, A, to produce an annular space, into which is placed the filter-water reservoir F, (shown on an enlarged scale in Fig. 2,) said reservoir consisting of an annular vessel having in its bottom $f$, Fig. 5, two or more lozenge-shaped chambers, H, serving as sponge-cups, and at the same time as outlets from the filter-water reservoir F. In the upper concave of this filter-cup there is a large opening, $h$, through which a sponge is introduced into the lozenge-shaped cup, and in the lower concave is a smaller outlet, $h'$, through which the water passes to the filter bed N, Fig. 2, below the filter-water reservoir, said outlet $h'$ being made so much smaller that the sponge mentioned cannot be passed through it, either accidentally or otherwise. The edge around the aperture $h$ in the filter-cup H is "wired," or rounded-off at $h''$, so that the sponge may be readily withdrawn from the cup whenever desired without tearing said sponge. This rounding off at $h''$ also serves to direct the water through the center of the sponge, and prevents it from following the line of the metal.

The filter-bed N consists of the usual materials—viz., charcoal, fine and coarse gravel, placed in layers in the usual manner. It rests upon a perforated diaphragm placed into the receptacle A a suitable distance below the filter-water reservoir E, so as to leave in the lower portion of the receptacle A a space, S, Fig. 2, serving as a reservoir for the filtered drinking-water, said receptacle A being provided with a boss, into which a faucet, G, is inserted, by means of which the drinking-water is removed from the drinking-water reservoir.

In the ice receiver E there is a similar faucet, G, by means of which the melted water from the ice is withdrawn from said ice-receiver E, the two faucets E E being placed side by side, (by preference,) as shown in Fig. 1.

V is a vent-passage leading from the drinking-water reservoir to the exterior of the vessel A upward as high as the said vessel A. This vent-passage permits air to enter the drinking-water reservoir whenever water is drawn from that chamber. The vessel A is closed by means of a removable filled cover, I, having a recess in its under side to admit a second but smaller cover, K, placed onto the ice-receiver E, as clearly illustrated in Fig. 1. Said vessel A is, furthermore, provided with a pair of handles, J, Fig. 1, by means of which it is carried about.

In operation, the water to be filtered and cooled for drinking purposes is poured into the filter-water reservoir F. From here it passes through the sponge-cup H and the filter-bed N into the drinking-water reservoir S, from which it is withdrawn as occasion requires through the faucet G'. Into the receiver E the ice is placed, and the water resulting from its melting is collected within, and may be withdrawn from said receiver through the faucet G. It will thus be readily seen that the water resulting from the melting of the ice is not permitted to commingle with that passed through the filter, and that thereby the contamination of the filtered water by impurities from the ice-water is effectually guarded against.

The apparatus may be made from any suitable sheet metal, such as is now usually employed in the manufacture of water filters and coolers, and the various reservoirs containing the liquids may be covered with a vitrified coating, (so-called "porcelain-lined,") if desired, in the now well-known manner.

A combined filter and cooler substantially as hereinbefore described may be manufactured and sold as cheaply as any other first-class article of the class mentioned, and the construction of the sponge-cup may be readily applied to other filters, if desired.

To prevent the ice when placed into the ice-receiver E from damaging the bottom of the said receiver I place into the said receiver an auxiliary bottom, L, consisting of a convex disk, L, Fig. 6. This convex plate receives the blows from the ice, and if indented therefrom to such an extent as to render its further use undesirable may be readily replaced by a new one at a trifling expense. This auxiliary bottom is quite an essential appendage to my water filter and cooler, inasmuch as it prevents both the indenting (and thereby destruction) of the ice-receiver and the chipping off of the vitrified lining of said reservoir. It is stiffened by means of cross-wires on the concave side, as M as shown in Fig. 6, and with a finger-hole N, to enable its removal from the ice-receptacle E.

Having thus fully described my invention, I claim as new, and desire to secure to me by Letters Patent of the United States—

1. A combined filter and water-cooler, consisting, essentially, of an outer receptacle, A, having centrally an ice-receiver extending the entire depth of the structure, an annular ring-shaped removable filter water-reservoir, F, surrounding said ice-receiver E, the filter-bed N, and the drinking-water reservoir S, said ice-receptable being removably inserted, substantially as and for the object stated.

2. In combination with the drinking-water reservoir S, the superimposed filter-bed N, and the filter-water reservoir F, said drinking water reservoir being provided with the vent-tube V, as described.

3. In water-filters, a sponge-cup consisting of a lozenge-shaped vessel, H, inserted into or secured to the bottom of the filter-water reservoir F, said vessel H having the ingress-opening $h$ with the rounded edge $h''$, and the egress-passage $h'$, as and for the object specified.

4. In an ice-water cooler, the combination, with the ice-receiver, of an auxiliary removable bottom, I, consisting of a concavo-convex disk having the convex side uppermost and the concave side provided with the re-enforcing cross-wires, as and for the object stated.

5. In water filters and coolers, a filter-water pan consisting of an annular ring-shaped receptacle removably resting with its upper edge upon the upper edge of the receptacle A, and having in its bottom the sponge-cups H, as described, with the ice-receiver within the ring-shaped receptacle E, as specified.

In testimony that I claim the foregoing as my invention I have hereto set my hand in the presence of two subscribing witnesses.

JAMES CARTER.

Attest:
MICHAEL J. STARK,
M. HEIM.